(12) United States Patent
Ishibashi et al.

(10) Patent No.: US 6,442,114 B1
(45) Date of Patent: Aug. 27, 2002

(54) OPTICAL DISK SIGNAL REPRODUCING APPARATUS AND CROSSTALK CANCELING SYSTEM FOR USE THEREIN

(75) Inventors: Hiromichi Ishibashi, Ibaraki; Ken'ichi Kasazumi, Takatsuki, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/406,735

(22) Filed: Sep. 28, 1999

(30) Foreign Application Priority Data

Sep. 28, 1998 (JP) .......................................... 10-273379

(51) Int. Cl.$^7$ ................................................ G11B 7/00
(52) U.S. Cl. ................................ 369/47.17; 369/53.33; 369/124.03; 369/124.14
(58) Field of Search ........................ 369/44.27, 44.28, 369/44.29, 44.32, 47.14, 47.16, 47.17, 53.33, 124.03, 124.14

(56) References Cited

U.S. PATENT DOCUMENTS 6,262,954 B1 * 7/2001 Watabe .................... 369/44.34

FOREIGN PATENT DOCUMENTS

| JP | 6-36290 | 2/1994 |
| JP | 7-176052 | 7/1995 |

* cited by examiner

*Primary Examiner*—Nabil Hindi
(74) *Attorney, Agent, or Firm*—Wenderoth, Lind & Ponack, L.L.P.

(57) ABSTRACT

In a crosstalk canceling system for use in an optical disk signal reproducing apparatus, rough delay units roughly adjust a delay amount of reproduction signals and fine delay units finely adjust a delay amount with high precision, and a delay amount control unit controls the delay amounts of the rough and fine delay units so that the jitter of the reproduction signal is minimized.

12 Claims, 6 Drawing Sheets

OPTICAL DISK SIGNAL REPRODUCING APPARATUS AND CROSSTALK CANCELING SYSTEM FOR USE THEREIN

BACKGROUND OF THE INVENTION

1. Field of the Invention

The present invention generally relates to an optical disk signal reproducing apparatus which is designed to irradiate a plurality of laser beams onto an optical disk medium having a high packing recording density and to reproduce information signals recorded therein, and in particular to a crosstalk canceling system for use in the signal reproducing apparatus for canceling crosstalk components of main track information from its adjacent track information by adjusting time differences of individual detected multibeam signals so that the respective reproduced signals have substantially no time lag to accurately cancel the crosstalk components.

2. Description of the Prior Art

Figure 7:
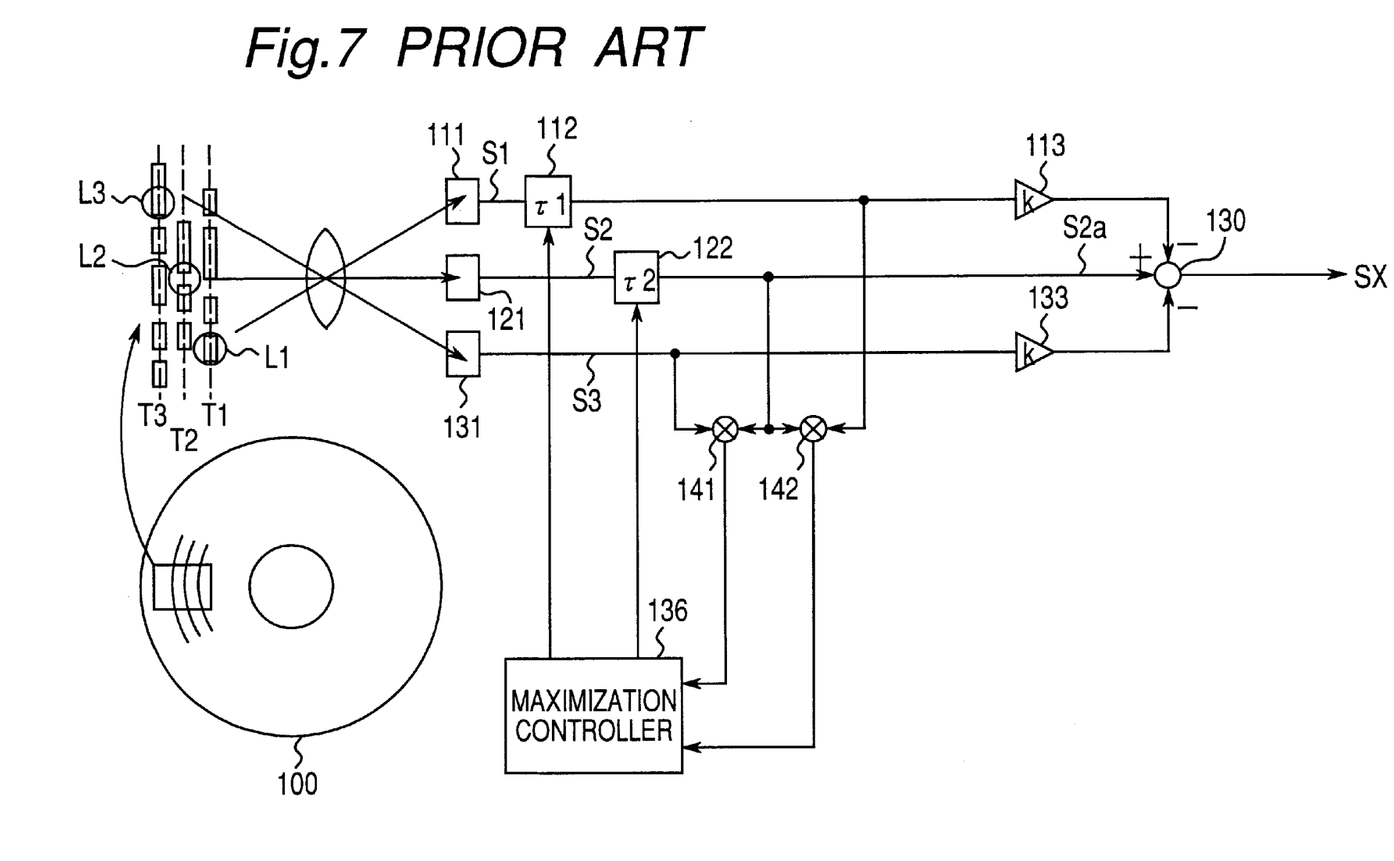
FIG. 7 is a block diagram showing a conventional optical disk signal reproducing apparatus.

In recent years, with the tendency of forming the optical disk medium into high density, a more advanced technique has been required for the optical disk signal reproducing apparatus. Hereinafter, referring to the drawings, explanation is given on an example of the conventional optical disk signal reproducing apparatus. FIG. 7 shows a block diagram of a conventional optical disk signal reproducing apparatus.

In FIG. 7, laser beams L1, L2, and L3 are irradiated respectively on the tracks T1, T2, and T3 formed onto an optical disk medium or carrier 100, and their reflective light beams are projected respectively onto the light receiving elements such as photo detectors 111, 121, and 131, and are outputted as the electric detection signals S1, S2, and S3, respectively. Assuming that the track from which the playback information signal is desired to be actually received is T2, the laser beams L1, L3 (sub-beams) are for canceling the crosstalk components leaking in from the adjacent tracks T1, T3 while the laser beam L2 (main beam) scans the track T2. In other words, in obtaining the information reproducing signal SX, gain adjusters 113, 133 and addition/subtraction operational amplifier 130 perform the following operation:

$$SX = S2 - k \times (S1 + S3)$$

and the crosstalk components are electrically canceled.

However, owing to the following reasons, the three laser beams to be irradiated on the optical disk medium are required to be positioned at some distance in the tangential direction of the tracks to a certain extent, so that it is not possible to cancel the crosstalk only by the simple addition/subtraction as described above. That is to say, ideally, the laser beams L1, L2, and L3 are required to be irradiated in adjacent relations in the track radial direction. By so practicing, because the track pitch is narrow, the respective laser beams overlap one another, with the inevitable consequence that the beams to be projected onto the light receiving elements mutually overlap, making it impossible to receive the respective beams independently by the light receiving elements 111, 112, and 113. Therefore, it becomes necessary to dispose the respective beams at a certain distance in the tangential direction. At this time, however, there arise time differences in the output signals of the light receiving elements 111, 121, and 131 in proportion to the separation distance in the tangential direction. Accordingly, the time differences that occurs here are corrected by the first and second variable delay elements 112, 122.

In fact, however, it is difficult to control strictly the mutual distances between the laser beams L1, L2, and L3. Even if they could be successfully controlled, it is necessary to set the delay amounts to be generated by the above variable delay elements 112, 122 to be always in optimum condition, because the time differences fluctuate depending on the rotational linear velocity of the optical disk medium. The multiplier 141 detects the correlation between the output signal of the light receiving element 131 and the output signal of the second variable delay element 122, and the multiplier 142 detects the correlation between the output signal of the second variable delay element 122 and the output signal of the first variable delay element 112, respectively. A maximization control means 136 carries out the delay adjustments of the above delay elements 112, 122, respectively, which is disclosed, for example, in the Japanese Patent KOKAI Publication HEI7-176052.

According to the above constitution, however, there are such problems that it is difficult to realize such delay elements 112, 122 that should satisfy both the delay amount and the delay precision, and in the case of using the multipliers 141, 142, the delay amounts cannot be adjusted exactly to the optimum amount because of low detection sensitivity of the correlation signals.

These subjective problems are analyzed as follows. First, the distance between the laser beams L1 and L2 in the track tangential direction or the distance between the laser beams L2 and L3 in the track tangential direction is required to be about 10 $\mu$m, in consideration of the configurations and dispositions of the light receiving elements 111, 121, and 131. On the other hand, the recording density of the information recorded in the optical disk medium is, taking an example of a DVD (digital video disk) having PWM recording using, for example, 8–16 modulation codes, about 0.1 $\mu$m per 1 channel bit. Accordingly, even the distance of 10 $\mu$m corresponds to a difference of as much as 100 bits.

As to the distinctive means for delaying, there has first been considered a constitution to make a series connection of a plurality of analog delay elements in a ladder form. However, the analog delay element itself has a group delay characteristic, and according to a trial calculation, the delay amount in which the group delay does not matter is at most about 10 bits, and it is almost impossible to realize a delay of 100 bits.

As a method for obtaining a delay amount, there can be considered, for example, a sample and hold type filter such as a switched capacitor filter or a digital filter. By using such a filter, it is possible to maintain group delay without respect to the delay amount. However, as the delay precision is determined by the sampling clock in the sample and hold type filter, if it is desired to elevate precision, the sampling clock frequency must be increased, in proportion to which the number of sample holding elements and the operation speed must be increased. In case of using a channel clock for the sampling clock, as 1 clock corresponds to 1 bit delay, if it is desired to make a delay of 100 bits, there are required 100 pieces of sample holding elements, and yet the respective sample holding elements are required to operate at 27 MHz in case of the DVD reproduction at standard speed.

However, in the case of using a channel clock, the delay amount is variable only at the rate of one bit by one bit, and there should be problems in the point of the delay precision. According to an experiment, in order to make idealistic cancellation of crosstalk, matching of the delay of at least ¼ precision is necessary. When it is desired to realize this state by sample holding, the sampling frequency is required to be 108 MHz or four times the channel clock, and the necessary sample holding elements are increased by a factor of 4 (i.e., 400 elements).

SUMMARY OF THE INVENTION

The present invention has been developed to solve these problems and has an object to provide an optical disk signal reproducing apparatus wherein the optimum delay amount can be set very precisely with a simple construction of a lower cost, having a sufficient resolution accuracy, by realizing necessary delay adjustments by using rough delay means of a digital control system constituted by a shift register and fine delay means of an analog control system constituted by group delay filters, and further by executing search of the optimum delay amount by using jitter detecting means.

In order to achieve the object mentioned above, the present invention provides an optical disk signal reproducing apparatus which is provided with an optical disk medium having a plurality of adjacent recording tracks formed thereon to be irradiated with multi laser beams with time differences to generate a plurality of detection signals corresponding to the multi laser beams to thereby obtain a reproduction signal of desired information recorded on a target track while canceling crosstalk components thereof, wherein the apparatus comprises: rough delay means for roughly adjusting a delay amount in delaying preceding detection signals in a rough delay resolution; and fine delay means for finely adjusting a delay amount in delaying the preceding detection signals in a high precision finer than the minimum delay resolution of said rough delay means.

In this construction, the apparatus further comprises delay amount control means for detecting a jitter of the reproduced information signal and controlling the delay amounts of said rough delay means and fine delay means.

According to another aspect of the present invention, there is provided an optical disk signal reproducing apparatus which is provided with an optical disk medium having a plurality of adjacent recording tracks formed thereon to be irradiated with multi laser beams with time differences to generate a plurality of detection signals corresponding to the multi laser beams to thereby obtain a reproduction signal of desired information recorded on a target track while canceling crosstalk components thereof, wherein the apparatus comprises: delay means for delaying preceding detection signals; jitter detecting means for detecting a jitter of the reproduced information signal; and delay amount control means for controlling the delay amounts of said delay means so that the jitter is minimized.

In this construction, said delay means comprises: a rough delay means for providing a roughly adjusting delay amount for delaying the preceding detection signals with a rough delay resolution; and a fine delay means for providing a finely adjusting delay amount for delaying the preceding detection signals with a high precision finer than the rough delay resolution of the rough delay means.

According to another aspect of the present invention, there is provided a crosstalk canceling system for use in an optical disk signal reproducing apparatus, which comprises: a rough delay means for providing a roughly adjusting delay amount for delaying preceding reproduction signals with a rough delay resolution; a fine delay means for providing a finely adjusting delay amount for delaying the preceding reproduction signals with a high precision finer than the rough delay resolution of the rough delay means; a jitter detecting means for detecting a jitter of the reproduction signal; and a delay amount control means for controlling the roughly adjusting delay amount of the rough delay means and the finely adjusting delay amount of the fine delay means so that the jitter is minimized.

By the arrangements as described above, according to the present invention, by providing rough delay means for executing the delay amount in the unit of clock period and fine delay means for continuously generating the delay amount within one clock period, the time difference according to the distance between the main beam and the sub-beam in the track tangential direction can be corrected in high precision. And further, by executing to search the optimum delay amount by using jitter, reproduction signal, optimum delay amount can be set in good precision.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which.

DETAILED DESCRIPTION OF THE PREFERRED EMBODIMENTS

Before the description proceeds, it is to be noted that, since the basic structures of the preferred embodiments are in common, like parts are designated by the same reference numerals throughout the accompanying drawings.

A first preferred embodiment of an optical disk signal reproducing apparatus using a crosstalk canceling system will be described below with reference to the accompanying drawings.

In the first embodiment, the essential constitution is such that, by using rough delay means and fine delay means together, the delay amount and delay precision are bilaterally improved, and further, by searching an optimum delay amount so as to make a jitter minimum, the optimum delay amount can be set very precisely. In this construction, the fine delay means delays given reproduction signals while executing the fine adjustment of the delay amount with high precision finer than the minimum delay resolution of the rough delay means.

Figure 1:
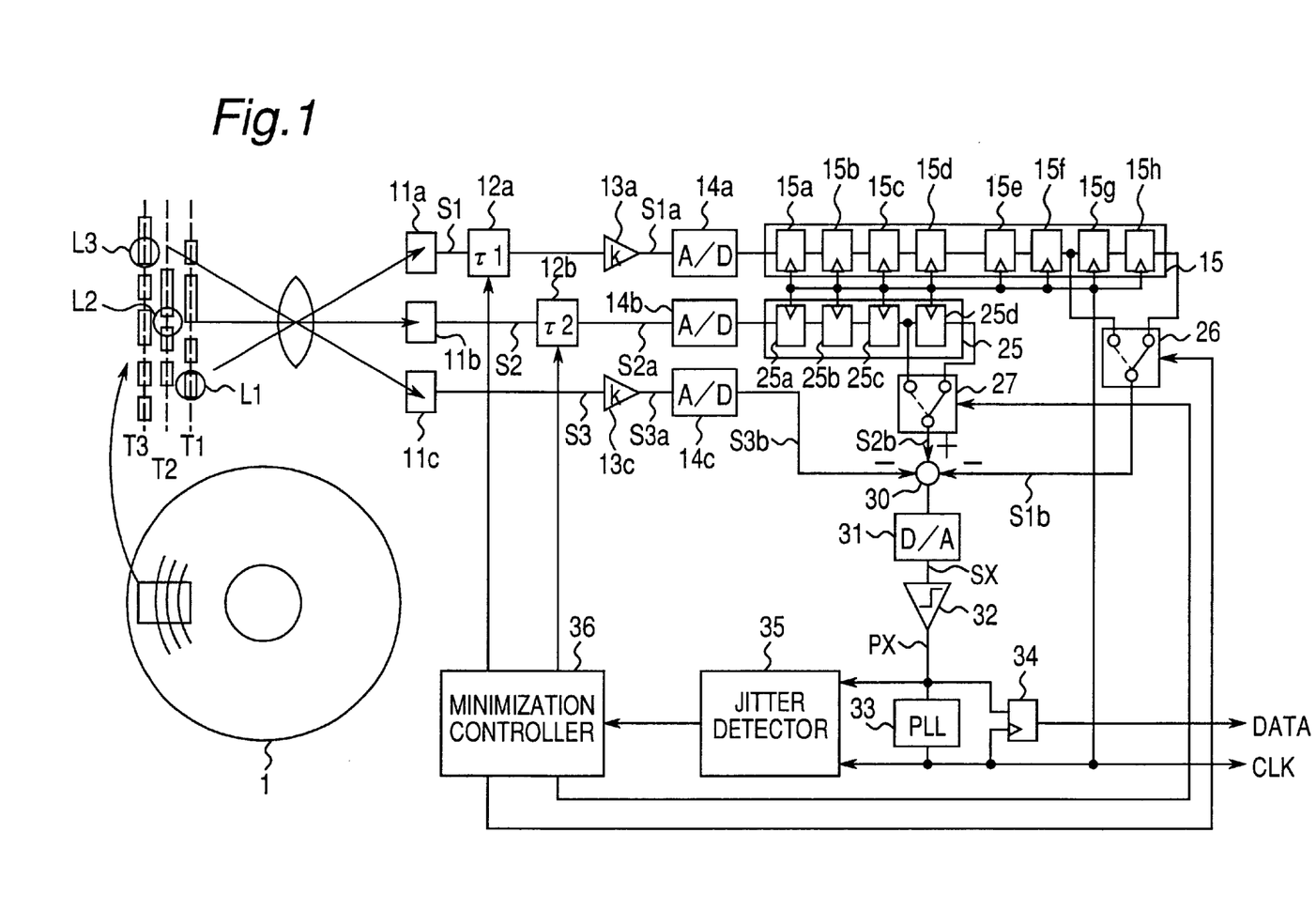
FIG. 1 is a block diagram of an optical disk reproducing apparatus according to a first embodiment of the present invention.

FIG. 1 shows a block diagram of the optical disk reproducing apparatus according to the first embodiment of the present invention. In FIG. 1, parts 11a, 11b, and 11c are respectively first, second, and third light receiving elements such as photo detectors, which are designed to convert the reflective rays of the laser beams L1, L2, and L3 irradiated on three adjacent tracks T1, T2, and T3 formed on an optical disk medium 1 into electric signals and generate reproduced detection signals S1, S2, and S3, respectively. Here, a laser beam L2 is a so-called main beam, to be irradiated on the track in which information is desired to be reproduced. Laser beams L1 and L3 are sub-beams to be used for eliminating crosstalk of the main beam. Though the definitive method for forming the laser beams L1, L2, and L3 is not specifically illustrated, the laser beams may be formed, for example, from three laser beam generating sources, or a stripe of laser beam may be diffracted in three directions by using a diffraction grid to obtain three beams.

Parts 12a and 12b are first and second delay elements for fine adjustment, which selectively, continuously generate delays of no more than 1 channel clock period (corresponding to 1 bit) to constitute the fine delay means of an analog control system of this embodiment. 13a and 13c are first and second coefficient multipliers such as gain adjusters having gain adjustment functions, being designed to multiply the weighting coefficient "k" for obtaining the optimum crosstalk canceling effect.

Parts 14a, 14b, and 14c are first, second, and third AD converters, respectively, being designed to convert the reproduction signals S1a, S2a, and S3a, into digital signals. Reference numeral 15 denotes a first shift register constituted by registers 15a–15h which are operated in synchronization with a clock CLK. Similarly, 25 denotes a second shift register constituted by registers 25a–25d. Here, because the output of an AD converter 14a or 14b is naturally parallel (e.g., 8 bit) output, each register must be of a parallel constitution, but merely for simplicity it is illustrated in a single bit constitution. Parts 26 and 27 are first and second tap changeover units, which respectively select optional register outputs of the first and second shift registers 15, 25 to adjust the delay amounts in bit unit. The rough delay means of a digital control system for rough adjustment in this embodiment is constituted by the AD converters 14a, 14b, 14c, shift registers 15, 25, and tap changeover means 26, 27. Thus, the rough delay means is comprised of a group of serially connected sample and hold elements which are operated in synchronization with the sync clock CLK. Thus, the discrete signal strings are generated as the result of the sample and hold operation executed by the sample and hold element group.

Reference numeral 30 denotes addition/subtraction means constituted by an operational amplifier and the like for executing crosstalk addition/subtraction. Reference numeral 31 denotes a DA converter for DA converting the output signal of the addition/subtraction signals of the above addition/subtraction means 30 to produce the information reproduction signal SX. Reference numeral 32 denotes a comparator for producing information reproducing pulse signal PX by making the information reproduction signal SX into binary form. Reference numeral 33 denotes a PLL (phase lock loop) circuit, which is to form and extract the clock CLK based on the input of the reproduction information signal (DATA), which the input signal is sent by a latch circuit 34 along with the clock CLK to the latter stage (e.g., digital video decoder).

Reference numeral 35 denotes a jitter detector for measuring the jitter between the information reproduction pulse signal PX and the clock CLK, and outputting the signal in proportion to the jitter amount (jitter will be described later). A minimization control unit 36 effects analog control adjustments of the continuous variable delay amounts $\tau 1$, $\tau 2$ of the delay elements 12a, 12b for fine adjustment so as to make this jitter amount minimum, and searches to set the optimum register output selected for the digital control adjustment by the tap changeover means 26, 27.

With respect to the optical disk reproducing apparatus constituted as above, the operation will be described below with reference to FIGS. 1, 2 and 3.

Figure 2:
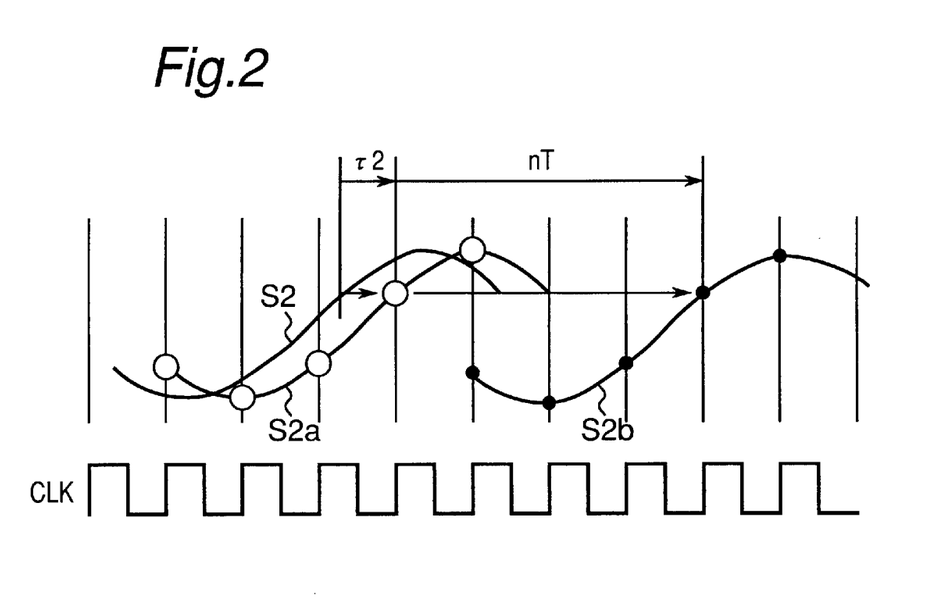
FIG. 2 is a timing chart illustrating a sharing in functions between fine adjustment and rough adjustment in the first embodiment.

FIG. 2 is a timing chart illustrating the sharing of the functions for adjusting the delay amount between the second delay element 12b for fine adjustment and the second shift register 25 for rough adjustment with respect to the main beam L2. At first, the signal S2 formed by the laser beam L2 is delayed by a delay time T2 by the second delay element 12b to generate the signal S2a. The signal S2a is sampled by the second AD converter 14b in synchronization with the clock CLK and converted into digital signal. The resulting digital signal is synchronized with the clock CLK and transmitted sequentially to the registers 25a–25d in the shift register 25. Accordingly, in each output of the registers 25a–25d there are obtained the digital delay signals with delay of the signal S2a in the sequence of the clock period (T). Of the above digital delay signals, assuming that S2b is the signal obtained by selecting any optimum register by the tap changeover means 27, the signal S2b is to be delayed by the multiple of an integer of the clock period (T) to the signal S2a, i.e., by nT (4T in the example of FIG. 2). Accordingly, the amount of delay from the initial signal S2 becomes:

$$\tau 2 + nT,$$

where n is an integer.

Accordingly, by the co-use of the delay element 12b for fine adjustment in which the delay amount is continuously variable and the shift register for rough adjustment in which the delay amount can be set in the unit of the integer multiple of the clock period, the required delay amount can be obtained very precisely. At this time, the maximum delay amount of the delay element 12b suffices with the delay amount corresponding to 1 bit, provided that it is the above clock period (T), i.e., channel clock. Accordingly, as to the definitive constitution of the delay element 12b, an appropriate one is considered to be an analog group delay filter having a transmission function represented by the expression:

$$G = (1 - j\omega/\omega 2)/(1 + j\omega/\omega 2)$$

which is obtained by dividing the Laplace transform of the output signal by the Laplace transform of the input signal corresponding to it, where the relation between $\omega 2$ and $\tau 2$ may be, for example, $$\omega 2 = 2\pi/\tau 2.$$

The first delay means 12a corresponding to the first sub-laser beam L1 and the first shift register 15 may be constructed as those having functions equivalent to the second delay element 12b and the second shift register 25, respectively. In this case, because the first sub-laser beam L1 is required to have approximately double distance from the second sub-laser beam L3 compared with the main laser beam L2, the number of the constituting registers (15a to 15h) in the first shift register 15 is required to be about twice that of the second shift register 25.

The output of the third AD converter 14c and the output signal of the first tap changer 26 through the first shift register 15 are inputted by subtraction to the operational amplifier 30, and on the other hand, the output signal of the second tap changer 27 through the second shift register 25 is inputted by addition to the operational amplifier 30, by which the following crosstalk addition and subtraction are executed to obtain information reproduction signal SX. Namely, the following operation is executed:

$$SX(t)=S2(t-(\tau 2+nT))-k\times \{S1(t-(\tau 1+mT))+S3(t)\}$$

where, m, n are integers, and t is time. In this case, mT and nT are respectively the delay amounts to be determined by the first and second shift registers 15, 25. These amounts are set by changing over the tap changing means 26, 27 based on the decision of the minimization control means 36. A method for determining the minimization control means 36 is explained below.

Firstly, the information reproduction pulse signals PX obtained by the comparator 32 and a channel clock, i.e., clock CLK, generated by the PLL are inputted to the jitter detection means 35 and the jitter is detected. It is noted here that the jitter is a non-correlative error between the data and the clock, being a parameter indicative of the signal reproduction state, which shows increase or decrease depending on the extent of noise, inter-digital interference or inter-track crosstalk. When this amount is so large as to exceed a data window margin, an error occurs, while on the contrary, by minimizing the jitter, the inter-track crosstalk is suppressed. As for a specific detection method of the jitter, for example, the jitter can be detected by obtaining a square average amount of the inter-data clock phase difference or the average amount of the absolute amounts.

Figure 3:
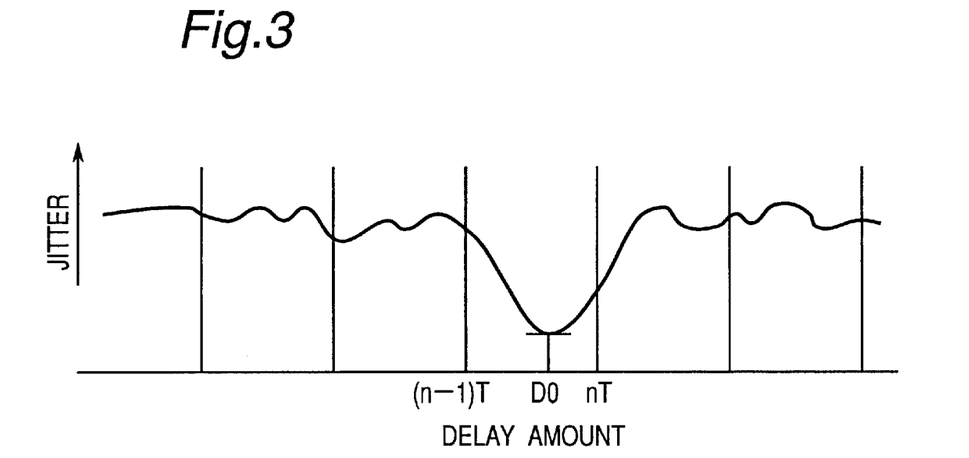
FIG. 3 is a characteristic view for explaining a jitter minimization operation in the first embodiment.

The minimization means 36 changes over the tap changeover means 26, 27 for digital adjustment so as to make the jitter minimum as shown in FIG. 3, and further adjusts the delay amounts $\tau 1$, $\tau 2$ of the delay elements 12a, 12b, respectively for analog adjustment. That is to say, if it is possible to adjust fully the time differences formed by the gap in the track tangential direction between the laser beam L1 and L3 or between the laser beam L2 and L3, then the inter-track crosstalk can be eliminated to the maximum extent, with the result that minimizes the jitter. Therefore, if, in order to make the jitter minimum, the delay amount is set to be D0 in a period in FIG. 3, the set delay amount should become the optimum set amount. Concretely, for example, while changing over the output taps of the first and second shift registers 15, 25 sequentially, first, search of taps is carried out to select the register in which the jitter becomes the smallest (rough adjustment), and further the continuous variable amounts $\tau 1$, $\tau 2$ of the delay elements 12a, 12b are minutely adjusted to search the delay amount D0 at which the jitter becomes the smallest.

Although, in FIG. 1, the second tap changeover means 27 is indicated as if it selects only the outputs of the registers 25c and 25d, it should be understood to change over all the register outputs that correspond to the necessary variable widths, in view of the purpose of the present invention. Furthermore, although, in FIG. 1, the second shift register 25 is indicated as if it is constituted by the four registers, because there are required the number of bits corresponding to the gap between the laser beams L2 and L3, if, for example, the gap between the two beams is 100 bits, then there should naturally be required about 100 registers. The relations are the same in the first shift register 15 and the first tap changeover means 26.

In the present embodiment, jitter is used as an indicator for searching the optimum amount for the delay amount because high detection sensitivity and reliability are obtainable especially in the case of reproducing the signals modulated by RLL (Run Length Limited) code. Here, the RLL code means the ones in which the shortest mark length and the longest mark length are limited to enhance recording density as in the cases of, for example, EFM (8–14 modulation) in CD or 8–16 modulation in DVD. In these two cases, the shortest mark length becomes three times the channel clock period. In case of the use of RLL code, the information is stored in concentration in the edge of each code, so that the recording density is enhanced, but on the other hand, there occurs easily edge shift in the recorded information by noise or crosstalk, and errors are apt to result therefrom. When edge shift occurs, naturally the reproduced signal jitter shows increase. Therefore, in other words, by observing the jitter, the extent of crosstalk can be accurately known.

With respect to another method for detecting the level of crosstalk besides the method by jitter observation, there is a method of operating a correlative signal. However, this method rather tends to show loss in detection sensitivity when RLL code is used. That is to say, because the correlative signal is operated in multiplication not only the edge but also the peak and bottom portions which are less susceptible to the effects of crosstalk inclusive, in the case of reproducing the code of longer shortest mark length the detection sensitivity is lowered according to the shortest mark length.

In light of the above, the present inventors specially noted that it should be possible to very precisely detect the errors which include the delay amounts by using a jitter detection, and have adopted a method for detecting the extent of the cross talk by jitter observation. By the way, the delay tolerance or allowable error (so-called margin) in which the jitter increases by 0.5% in a clock window ratio from the delay amount at which the jitter becomes the minimum is about ¼ of the clock period. That is to say, in order to perform ideal crosstalk cancellation, delay matching with ¼ bit precision is necessary. This point will be briefly explained below.

Figure 4:
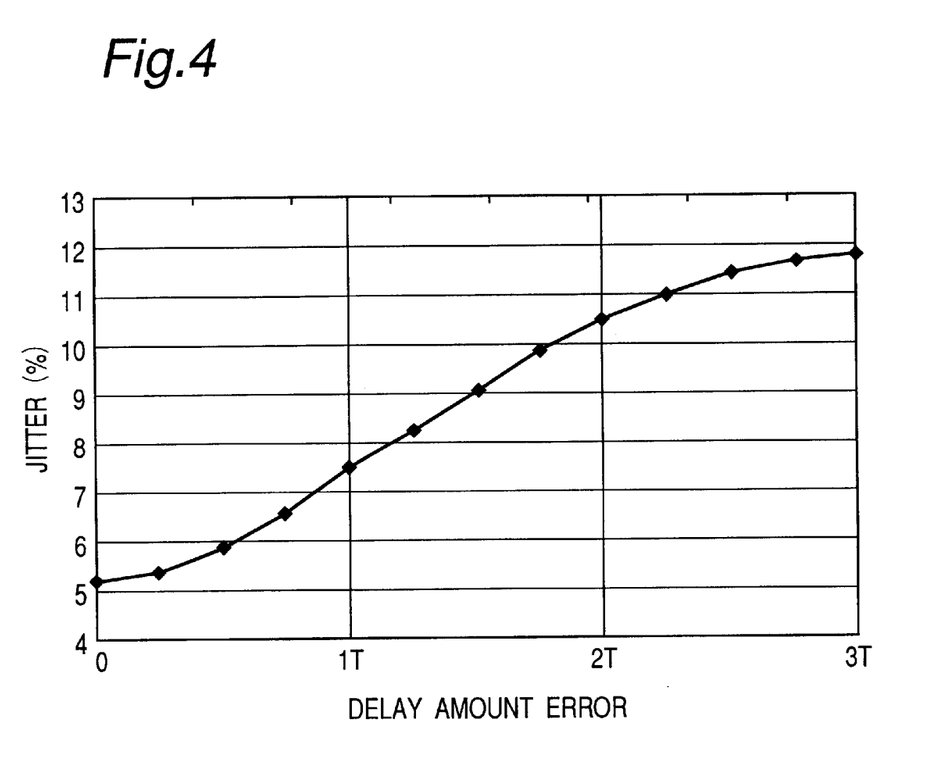
FIG. 4 is a graph view showing a relationship between an error of a delay amount and a reproduction signal jitter in the first embodiment.

FIG. 4 illustrates a relationship between the error of the delay amount and the reproduction signal jitter caused by the error. In the drawing the abscissa represents the delay amount error. When crosstalk cancellation is executed under the condition of 0 amount, i.e., under a condition of no error, the reproduction signal jitter becomes approximately 5%. When a delay error corresponding to 1 bit (1 period) has occurred, the jitter is aggravated by about 2.5% to become about 7.5%. Since crease of jitter by about 0.1% can normally be detected, it can be seen that the above matching errors can sufficiently be detected with a precision of about ¼ period of the clock period. However, this is not only means simply that the detection precision of the optimum delay amount becomes high when jitter is used but also it means that the delay amount is required to be matched in this precision, because the jitter is a parameter which is directly related with the reproduction error rate.

In case a delay error corresponding to 1 bit occurs, the jitter becomes about 7.5% as described above, though it is an amount of utterly no significance in reproducing the information with a reproducing signal jitter of about 5% degree. Though the jitter of about 7.5% is normally quite insignificant in reproducing information, when jitter by soiling of disk or head or jitter by noise is added, error may occur in the reproduction information. Accordingly, if it is desired to limit the degradation of jitter to a practically tolerable level, a delay error corresponding to 1 bit is insufficient, and matching of at least about ½ bit is necessary. When a delay error corresponding to ½ bit occurs, the jitter is aggravated by about 1% to become about 6% as in FIG. 4, but this amount is considered practically negligible. Accordingly, ideally, if matching of about ¼ bit can be made, then the jitter increase should be within the utterly negligible range.

As described above, according to the present embodiment, by using a shift register for rough adjustment which can vary the delay amount a unit of a clock period by a digital control system together with a delay element for analog fine adjustment in which the delay amount is continuously variable within one clock period, the delay amount of about 100 bits which occurs according to the distance between the laser beams in the track tangential direction can be corrected with high precision. And further, by using the reproduction signal jitter detecting means (35) as an evaluation amount, it becomes possible to search the optimum correction amount with high sensitivity.

In this embodiment, it is defined that the delay elements 12a, 12b act to correct 1 clock period, but this does not mean that the maximum variable amount is strictly limited within one clock period. Rather, the maximum variable amount may be set to be larger, e.g., a 4 period amount, so as to absorb the fluctuation of rotational linear velocity of the optical disk.

In the present embodiment, the rough delay means have been constituted to make AD conversion of the reproducing signals S1, S2, and S3 respectively so as to generate delay by the shift register. However, a constitution of plural series connection of the sample holding elements may be an analog element such as a switched capacitor filter wherein sequential sampling of the reproduced signals can be made by synchronizing with the clock.

In this embodiment, in the gain adjusters 13, 33, the weighting coefficient k is set to be fixed, but it may be such as to search automatically the optimum amount so as to make, for example, the jitter amount minimum.

It is further defined in this embodiment that the crosstalk addition/subtraction is subjected to digital processing, followed by DA conversion (31) for supply to the PLL circuit. However, the constitution may be such as to directly extract a clock signal by using digital PLL without making DA conversion.

Figure 5:
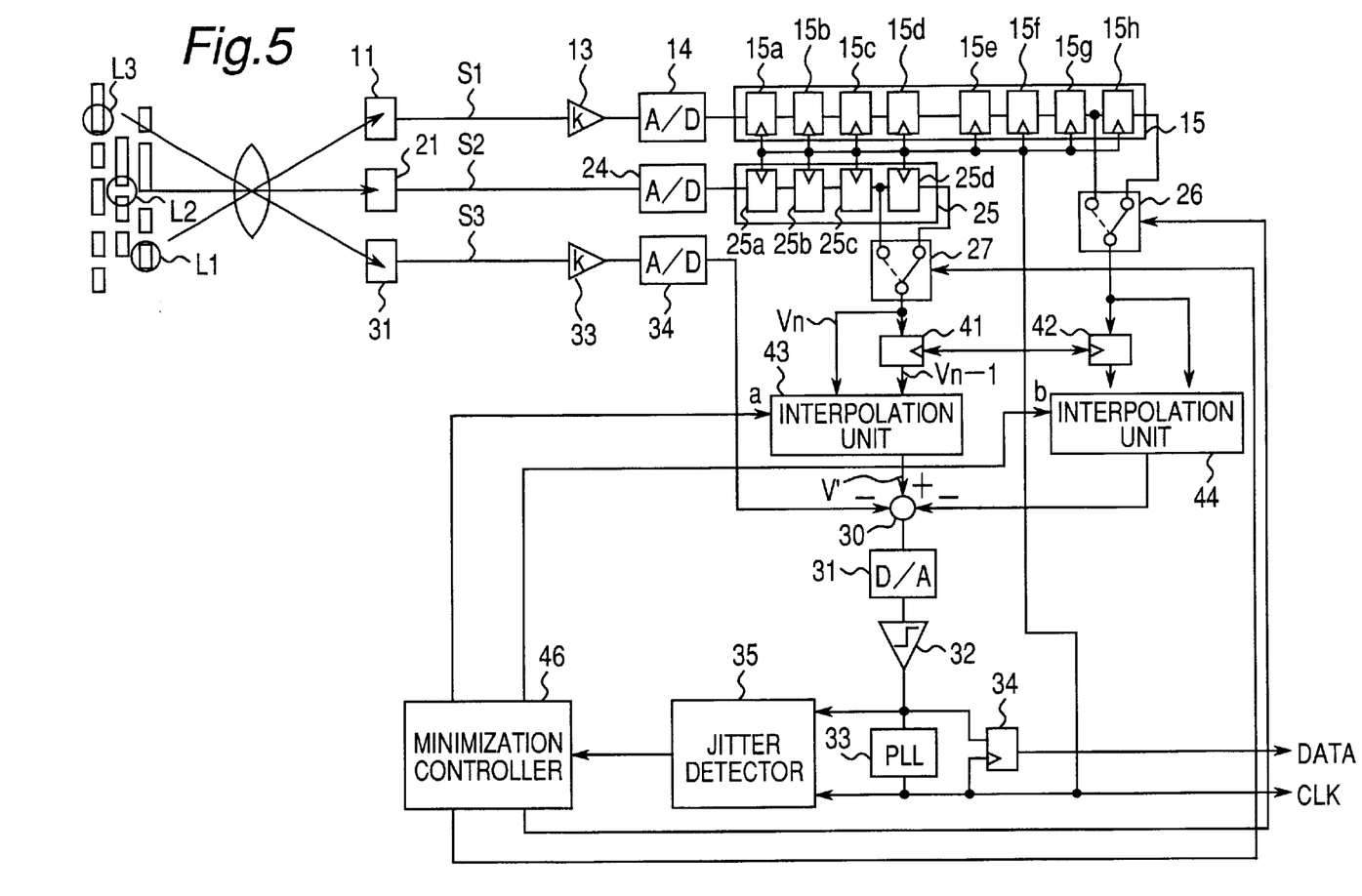
FIG. 5 is a block diagram of an optical disk reproducing apparatus according to a second embodiment of the present invention.

Next, the second embodiment of the present invention will be explained. FIG. 5 shows a block constitution view of the second embodiment in which fine delay adjustment can be made without using a delay element. In FIG. 5, the light receiving elements 11a, 11b, 11c, gain adjusters 13a, 13c, AD converters 14a, 14b, 14c, first shift register 15 (registers 15a–15h), second shift register 15 (registers 25a–25d), tap changeover means 26, 27, addition/subtraction means of operational amplifier 30, DA converter 31, comparator 32, PLL circuit 33, and jitter detecting means 35 have the same construction and functions as those of the first embodiment shown in FIG. 1.

In the constitution of FIG. 5, the difference from FIG. 1 lies in the point that the delay is generated proximately by interpolation means constituted by first and second latch registers 41 and 42 together with first and second interpolation operating units 43 and 44, without using any delay element for executing the delay fine adjustment smaller than 1 channel clock period T.

This function will be illustrated with reference to FIG. 5. First, the sampling data ($V_n$) which is sampled by the second AD converter 24 and delay corrected by the second shift register 25 in a unit of the channel clock is supplied to the delay means which is constituted by the latch register 41 and the first interpolation operation means 43. Here, the data to be supplied directly to the interpolation operation means 43 in the period of nT is assumed to be $V_n$. Since the latch register 41 holds the sampling data for one channel clock period (T), the data supplied from the latch register 41 to the interpolation operation means 43 is the data $V_{n-1}$, in the period of 1 channel clock before, i.e., (n−1)T. Here, assuming that the delay amount to be set by the minimization controller 46 is aT ($0 \leq a < 1$), the interpolation operation means 43 operates a linear interpolation amount V' as below:

$$V' = a \times V_{n-1} + (1-a) \times V_n$$

and outputs the interpolation amount V' in place of the data $V_n$, which is inputted to the addition/subtraction operational amplifier 30.

Figure 6:
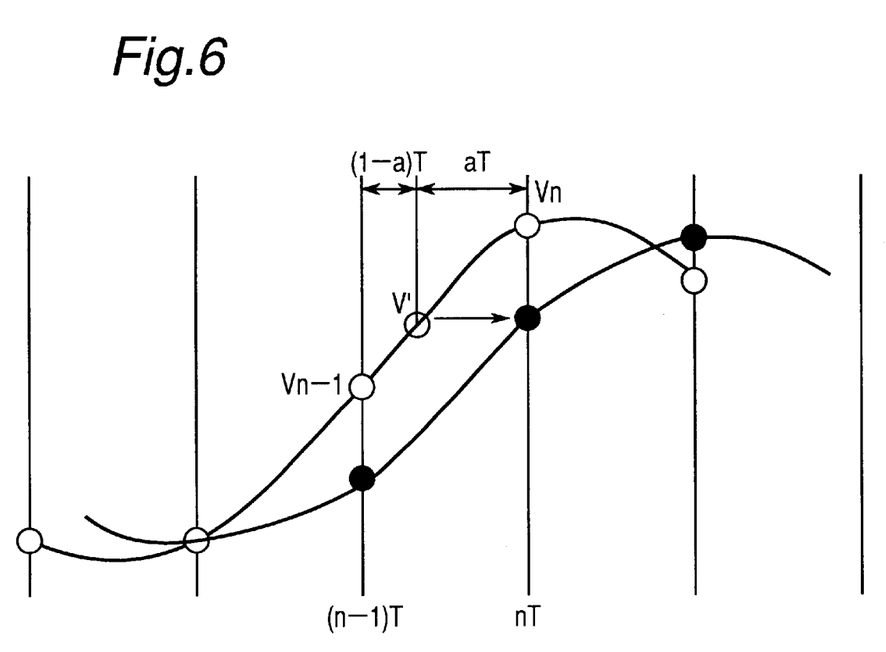
FIG. 6 is a graph view for explaining an operation of proximate delay according to the second embodiment of the present invention.

The above operations are executed in all the data lines, and as a result there are obtained the data which are proximately delayed by aT, as shown in FIG. 6. Similar processing is performed on the lines constituted by the first AD converter 14, shift register 15, latch register 42, and interpolation operation means 44, in which delay processing of bT ($0 \leq b < 1$) is executed proximately. With respect to the optimization of the delay amounts a, b, by searching to make the jitter smallest in the same manner as explained in the first embodiment, optimization can be made with high precision. In this embodiment, the delay means for fine adjustment is constructed by the interpolation means (41, 42, 43, 44) for interpolating the discrete signal strings sampled and held by the sample and hold element group using the optional coefficients (a, b).

As described above, according to this embodiment, through execution by using the interpolation of the sampling data, fine delay adjustment can be executed proximately. By this step, the delay elements 12, 22 become unnecessary, so that a lower cost can be realized.

In this embodiment, the interpolation operation means 43, 44 are defined to execute the linear interpolation operation processing, but the proximity precision is more enhanced by using a high dimension curve interpolation. That is to say, in the linear interpolation, there occurs a subject that the errors of the portion where the signal curvature is large (in the vicinity of the largest and smallest points) become large, as shown in FIG. 6. When a high dimension curve interpolation such as a secondary curve interpolation is used, the curve portion can be well brought into proximity and errors are reduced.

As described above, according to the present invention, by providing rough delay means for executing the delay amount in the unit of a clock period and fine delay means for continuously generating the delay amount within one clock period, the time difference according to the distance between the main beam and the sub-beam in the track tangential direction can be corrected with high precision. And further, searching for the optimum delay amount by using jitter, reproduction signal, optimum delay amount can be set with good precision.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An optical disk signal reproducing apparatus which is provided with an optical disk medium having a plurality of adjacent recording tracks formed thereon to be irradiated with a plurality of laser beams with time differences to generate a plurality of detection signals corresponding to the plurality of laser beams to thereby obtain a reproduction information signal of desired information recorded on a target track while canceling crosstalk components thereof, said apparatus comprising:

a rough delay means for providing a roughly adjusting delay amount for delaying preceding detection signals with a rough delay resolution; and a fine delay means for providing a finely adjusting delay amount for delaying the preceding detection signals with a precision finer than the rough delay resolution of said rough delay means.

2. The apparatus as claimed in claim 1, wherein the plurality of laser beams includes a main beam for reproducing desired information recorded on the target track and sub-beams for use in canceling the crosstalk components of the main beam.

3. The apparatus as claimed in claim 1, further comprising a delay amount control means for detecting a jitter of the reproduced information signal and controlling the roughly adjusting delay amount of said rough delay means and the finely adjusting delay amount of said fine delay means.

4. The apparatus as claimed in claim 1, wherein said rough delay means comprises a group of sample and hold elements which are operated in synchronization with a clock signal to generate discrete signal strings.

5. The apparatus as claimed in claim 4, further comprising a tap changeover means for respectively selecting optional outputs of said sample and hold elements to thereby adjust the roughly adjusting delay amount of said rough delay means in a stepwise manner.

6. The apparatus as claimed in claim 4, wherein said rough delay means comprises a shift register, and wherein said shift register comprises said group of sample and hold elements.

7. The apparatus as claimed in claim 1, wherein said fine delay means includes a filter means for generating optional group delay.

8. The apparatus as claimed in claim 4, wherein said fine delay means includes an interpolation means for interpolating the discrete signal strings generated by the sample and hold element group.

9. The apparatus as claimed in claim 8, wherein said interpolation means interpolates the discrete signal strings using optional coefficients a and b where $0 \leq a < 1$ and $0 \leq b < 1$.

10. The apparatus as claimed in claim 4, wherein the finely adjusting delay amount provided by said fine delay means is continuously variable while the roughly adjusting delay amount provided by said rough delay means is varied in an integer digit unit, and wherein a maximum finely adjusting delay amount of said fine delay means is within an amount corresponding to one clock period.

11. An optical disk signal reproducing apparatus which is provided with an optical disk medium having a plurality of adjacent recording tracks formed thereon to be irradiated with a plurality of laser beams with time differences to generate a plurality of detection signals corresponding to the plurality of laser beams to thereby obtain a reproduction information signal of desired information recorded on a target track while canceling crosstalk components thereof, said apparatus comprising:

a delay means for delaying preceding detection signals;

a jitter detecting means for detecting a jitter of the reproduction information signal; and a delay amount control means for controlling a finely adjusting delay amount and a roughly adjusting delay amount of said delay means so that the jitter is minimized, wherein said delay means comprises a rough delay means for providing a roughly adjusting delay amount for delaying the preceding detection signals with a rough delay resolution, and a fine delay means for providing a finely adjusting delay amount for delaying the preceding detection signals with a precision finer than the rough delay resolution of said rough delay means.

12. A crosstalk canceling system for use in an optical disk signal reproducing apparatus, comprising:

a rough delay means for providing a roughly adjusting delay amount for delaying preceding reproduction signals with a rough delay resolution;

a fine delay means for providing a finely adjusting delay amount for delaying the preceding reproduction signals with a precision finer than the rough delay resolution of said rough delay means;

a jitter detecting means for detecting a jitter of the reproduction signal; and a delay amount control means for controlling the roughly adjusting delay amount of said rough delay means and the finely adjusting delay amount of said fine delay means so that the jitter is minimized.

* * * * *

UNITED STATES PATENT AND TRADEMARK OFFICE
CERTIFICATE OF CORRECTION

PATENT NO. : 6,442,114 B1
DATED : August 27, 2002
INVENTOR(S) : Hiromichi Ishibashi et al.

It is certified that error appears in the above-identified patent and that said Letters Patent is hereby corrected as shown below:

<u>Title page,</u>
Item [75], Inventors, change "Ibaraki" to -- Ibaraki-shi -- and "Takatsuki" to -- Takatsuki-shi --.

Signed and Sealed this

Eleventh Day of March, 2003

JAMES E. ROGAN
*Director of the United States Patent and Trademark Office*